(12) United States Patent
Kleen

(10) Patent No.: US 7,262,516 B2
(45) Date of Patent: Aug. 28, 2007

(54) METHODS AND SYSTEMS FOR OPERATING ENGINE GENERATOR SETS

(75) Inventor: Randall John Kleen, Channelview, TX (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 11/182,472

(22) Filed: Jul. 15, 2005

(65) Prior Publication Data

US 2007/0013191 A1     Jan. 18, 2007

(51) Int. Cl.
*F02D 31/00* (2006.01)
*F02D 35/00* (2006.01)
*H02P 9/04* (2006.01)

(52) U.S. Cl. ............. 290/40 C; 290/40 B; 290/40 A
(58) Field of Classification Search ........... 290/1 A, 290/40 C, 40 B, 40 A; 322/20, 19, 59; 318/700
See application file for complete search history.

(56) References Cited

U.S. PATENT DOCUMENTS

| | | | | | |
|---|---|---|---|---|---|
| 4,031,407 | A | * | 6/1977 | Reed | 307/87 |
| 4,426,613 | A | * | 1/1984 | Mizuno et al. | 322/21 |
| 4,488,198 | A | * | 12/1984 | Christen et al. | 361/20 |
| 4,829,414 | A | * | 5/1989 | Yook | 363/20 |
| 5,150,568 | A | * | 9/1992 | White | 60/797 |
| 5,168,208 | A | | 12/1992 | Schultz et al. | |
| 5,390,068 | A | | 2/1995 | Schultz et al. | |
| 6,172,428 | B1 | | 1/2001 | Jordan | |
| 6,323,618 | B1 | * | 11/2001 | Kitamura et al. | 318/700 |
| 6,710,467 | B2 | * | 3/2004 | Braun et al. | 290/40 B |
| 6,956,301 | B2 | * | 10/2005 | Gupta et al. | 290/52 |
| 2003/0009302 | A1 | * | 1/2003 | Leslie | 702/65 |
| 2004/0007876 | A1 | * | 1/2004 | Braun et al. | 290/1 A |
| 2005/0173925 | A1 | * | 8/2005 | Farkas | 290/1 A |

OTHER PUBLICATIONS

EPO Search Report, App. No. EP 06 25 3556 (Oct. 31, 2006).

* cited by examiner

*Primary Examiner*—Julio C. Gonzalez
(74) *Attorney, Agent, or Firm*—Armstrong Teasdale LLP

(57) ABSTRACT

Methods and systems for an engine generator set that includes an electrical generator configured to provide electrical energy to a first load rated at a first voltage and a first frequency, and to provide electrical energy to a second load rated at a second voltage and a second, a prime mover coupled to the generator through a shaft, and configured to rotate the shaft at a first rotational speed at the first frequency and to rotate the shaft at a second rotational at the second frequency, and an engine generator set control system that includes a generator control system configured to control an output of the electrical generator, an engine control system configured to control a rotational speed of the shaft, and an output selector configured to modify the output of the engine generator set from the first voltage and the first frequency to at least one of the second voltage and the second frequency.

14 Claims, 3 Drawing Sheets

METHODS AND SYSTEMS FOR OPERATING ENGINE GENERATOR SETS

BACKGROUND OF THE INVENTION

This invention relates generally to electrical generator control systems and more particularly, to selectable frequency, voltage, protection and output ratings for electrical generators.

Engine generator sets are commonly utilized as prime or backup power sources for electrically driven equipment in applications and locations having different power supply requirements. For example, many locales require a 50 Hertz (Hz) electrical output, while others require a 60 Hz output, to match the operating frequency of the local grid. Engine generator set applications may have different power requirements. Voltage and frequency requirements of equipment powered by the engine generator set may vary. For example, in the United States 480V and 60 Hz is a common requirement for electrical equipment, whereas European applications are more likely to need 400V and 50 Hz power. Engine generator sets that are able to provide a certain power level at one voltage and frequency may not be able to supply the same power at another voltage and frequency.

Known engine generator sets are configured to accommodate operation in areas that include electrical systems having 50 Hz or 60 Hz. If an engine generator set is moved from one area to another having a different operating frequency, modifications to settings of generator protection devices, to electrically-powered auxiliary equipment, and to mechanical components are typically required.

Typically, engine generator set auxiliary equipment is powered from the output of the engine generator set. Accordingly, electrical equipment such as pump motors operate at the frequency that the engine generator set is designed to operate. Furthermore, mechanical components coupled to electric motors are sized to accommodate the output power levels of the electric motors to which the mechanical component is coupled.

Voltage regulators are typically designed to operate with a variety of different engine generator sets with a wide range of capabilities. Thus, a particular engine generator set, may not be capable of operating at all voltage choices available on the voltage regulator. The engine generator set also may not be able to meet the same power rating at one voltage as it can at a different voltage. In addition to setting the engine and voltage ratings for a particular application, relays and other protective devices contained in the engine generator set control system will need to be reset or replaced when the operation of the engine generator set is to be changed from one frequency to another. Protective relaying, such as over and under voltage relays and over and under frequency relays, disconnects a load, shuts down the engine, prevents excitation of the generator or protects the engine generator set in some other manner if a condition that could cause damage to the engine generator set is detected. For example, if the voltage exceeds the acceptable rating and the engine generator set has an overvoltage relay, the relay may trip a circuit breaker and disconnect the load, thus preventing damage to both the generator and the load. Relays must be set correctly to operate. For example, the voltage level at which the overvoltage relay will trip a circuit breaker is typically set manually.

To change the operation of an engine generator set from one operating frequency to a different frequency, a user may need a variety of skills. The user may need to change the engine rating, to change the voltage and frequency on the voltage regulator manually, to set protective relays, and to replace motors, pumps, heaters and other auxiliary equipment, and to ensure all settings and ratings are compatible with each other and the engine generator set. Technicians with these skills may be difficult to find in the remote areas where engine generator sets often run. The amount of labor and the cost of parts required may reduce the feasibility of a particular application, and the more steps the technician has to take to setup a engine generator set, the more chances there are for error.

BRIEF DESCRIPTION OF THE INVENTION

In one embodiment, an engine generator set that includes an electrical generator configured to provide electrical energy to a first load rated at a first voltage and a first frequency, and to provide electrical energy to a second load rated at a second voltage and a second, a prime mover coupled to the generator through a shaft, and configured to rotate the shaft at a first rotational speed at the first frequency and to rotate the shaft at a second rotational at the second frequency, and an engine generator set control system that includes a generator control system configured to control an output of the electrical generator, an engine control system configured to control a rotational speed of the shaft, and an output selector configured to modify the output of the engine generator set from the first voltage and the first frequency to at least one of the second voltage and the second frequency.

In another embodiment, a method of operating an engine generator set includes selecting an operating voltage and frequency from a plurality of predetermined operating voltages of the engine generator set from a first voltage and a first frequency to a second voltage and a second frequency, selecting the selected operating voltage and frequency for an electrical distribution panel electrically coupled to an output of the engine generator set such that electrical loads and electrical protection equipment coupled to the electrical distribution panel are configured to operate using the selected voltage and frequency, and selecting the selected operating voltage and frequency for a generator switchgear electrically coupled to an output of the engine generator set such that generator protection equipment coupled to the generator output are configured to operate using the selected voltage and frequency.

In yet another embodiment, an engine generator set output conversion system includes an output selector configured to modify the output of an engine generator set from a first output voltage and a first frequency to a second output voltage and a second frequency wherein the first output voltage is different than the second output voltage and the first frequency is different than the second output frequency, and a relay communicatively coupled to the output selector, the relay configured to select a first transformer tap corresponding to the first output voltage and select a second transformer.

DETAILED DESCRIPTION OF THE INVENTION

As used herein, an element or step recited in the singular and preceded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Figure 1:
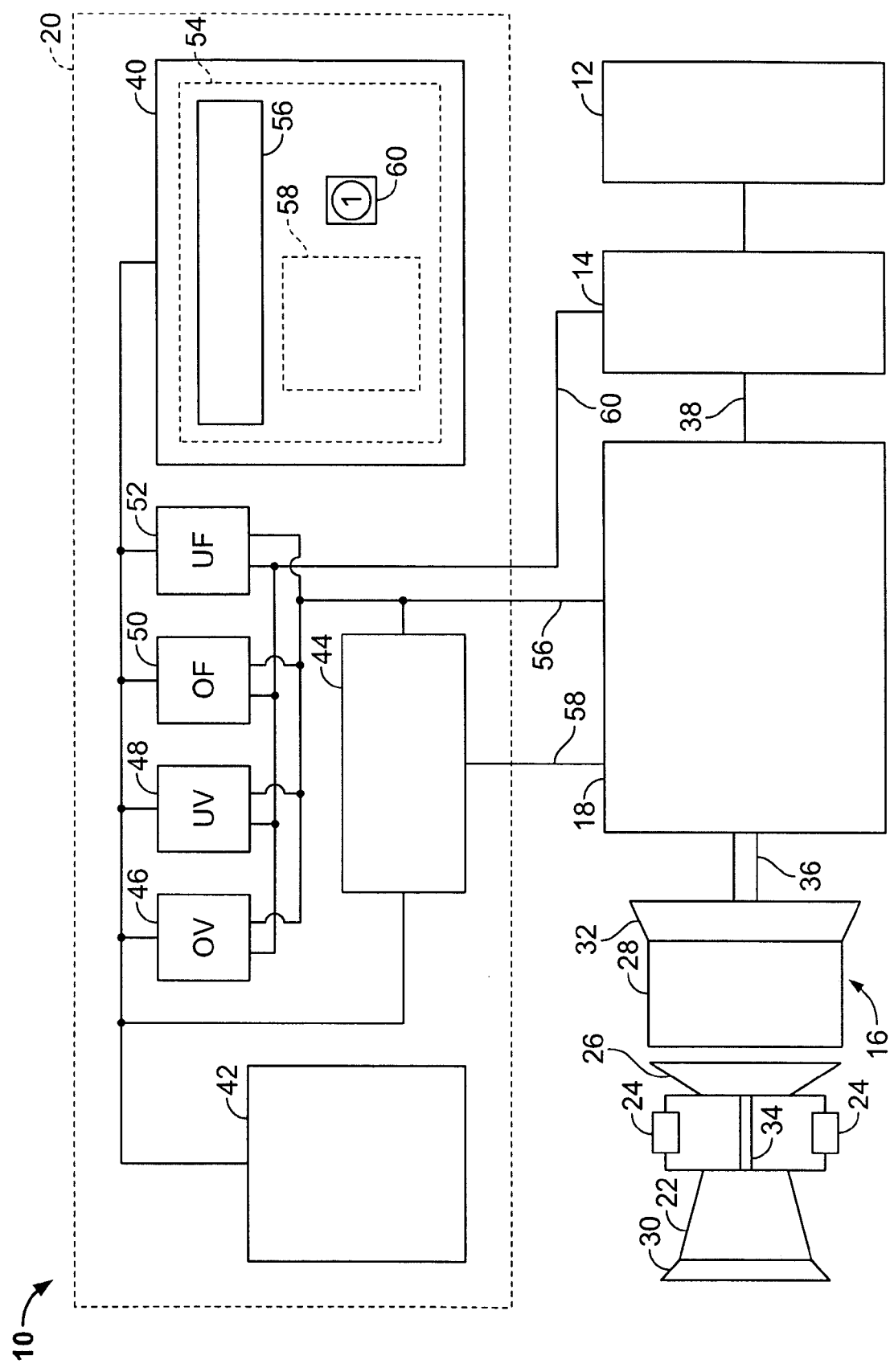
FIG. 1 is a schematic block diagram of an exemplary embodiment of an engine generator set.

FIG. 1 is a schematic block diagram of an exemplary embodiment of an engine generator set 10. Engine generator set 10 is coupled to a load 12 through a circuit breaker panel 14. In the exemplary embodiment, the engine generator set 10 includes an internal combustion engine 16, a generator 18 and a engine generator set control system 20. Circuit breaker panel 14 electrically couples the engine generator set 10 to load 12.

In the exemplary embodiment, engine 16 is a gas turbine engine including at least one compressor 22, a combustor 24, a high pressure turbine 26, a low pressure turbine 28, an inlet 30, and an exhaust nozzle 32 connected serially. In one embodiment, engine 10 is a TM2500 engine commercially available from General Electric Company, Cincinnati, Ohio. Compressor 22 and turbine 26 are coupled by a first shaft 34, and turbine 28 and generator 18 are coupled by a second shaft 36.

In operation, air flows into engine inlet 30 through compressor 22 and is compressed. The compressed air is then delivered to combustor 24 where it is mixed with fuel and ignited. Airflow from combustor 24 drives rotating turbines 26 and 28 and exits gas turbine engine 16 through exhaust nozzle 32.

In the exemplary embodiment, generator 18 is an AC generator mechanically coupled to shaft 36 such that the engine rpm determines the frequency of the AC power produced by generator 18. Generator 18 is coupled to circuit breaker panel 14 through leads 38 that transmit the AC power produced by generator 18 at a predetermined voltage and frequency to load 12 through the circuit breaker panel 14. In an alternative embodiment, leads 26 are coupled to load 12 through bus bars and disconnect switches (not shown).

In the exemplary embodiment, engine generator set control system 20 includes an engine generator set control panel 40, an engine control module ("ECM") 42, an automatic voltage regulator 44, an overvoltage relay 46, an undervoltage relay 48, an overfrequency relay 50, and an underfrequency relay 52. In an alternative embodiment, control system 20 is contained in one or more control modules. In another alternative embodiment, control system 20 may not include relays 46, 48, 50, and 52, or the relays 46, 48, 50, and 52 may be pan of voltage regulator 44, control panel 40 or another portion of control system 20. In the exemplary embodiment, control system 20 is physically located with engine 16 and generator 18. In an alternative embodiment, control system 20 or parts of control system 20 may be remotely located.

Generator control panel 40 includes an interface 54 to facilitate entering data into control system 20 and controlling engine 16. Interface 54 includes a display area 56 and a keypad 58. An output selector 60 is used to select an operating frequency of engine generator set 10. In the exemplary embodiment, output selector 60 is a key lock switch. In various embodiments, output selector 60 may be embodied as a password protected field on display 56, a submenu of display 56, or a separate keypad that requires a combination of entries to change the status of output selector 60.

Figure 2:
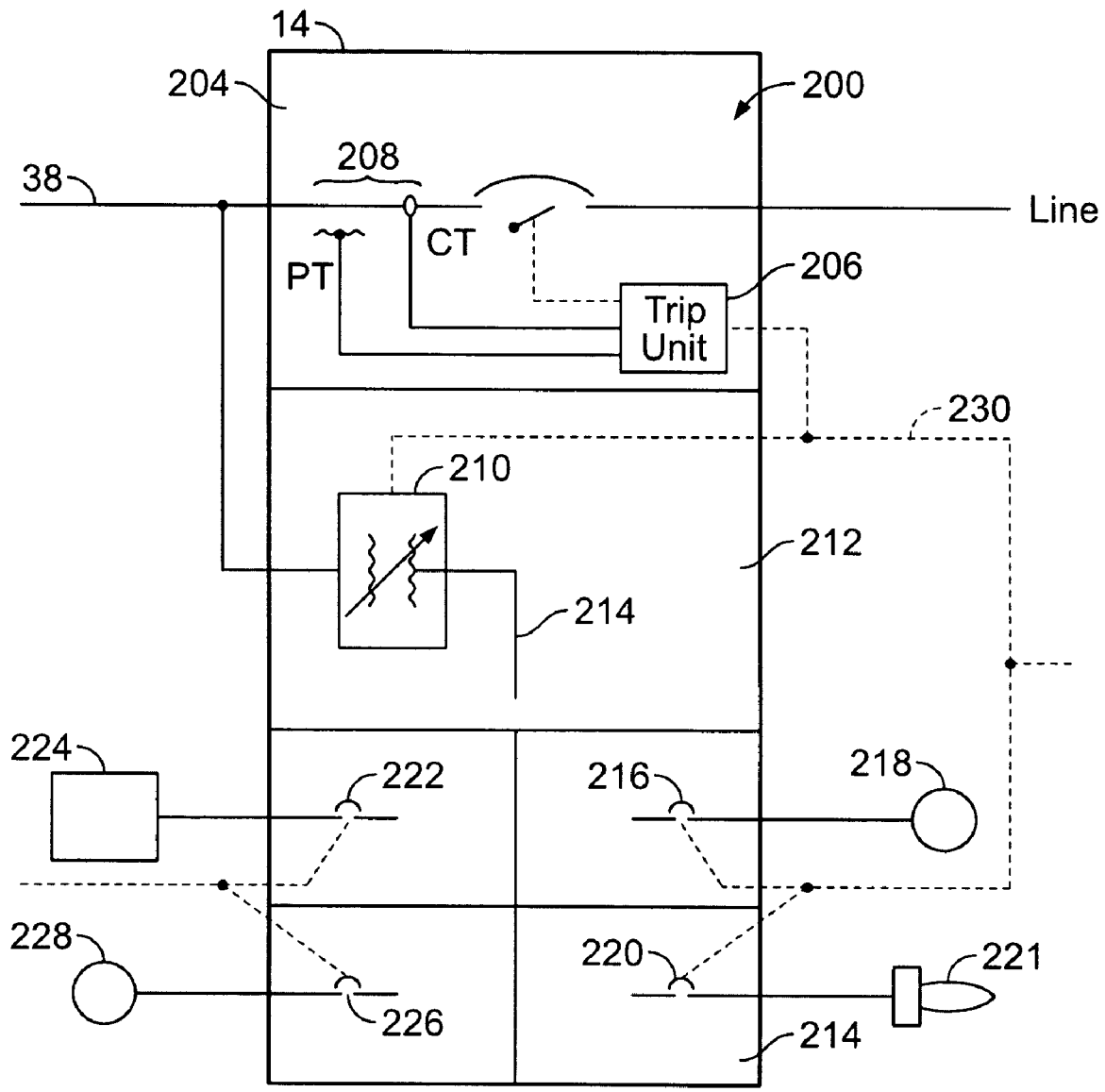
FIG. 2 is a schematic block diagram of an exemplary embodiment of circuit breaker panel shown in FIG. 1.

FIG. 2 is a schematic block diagram of an exemplary embodiment of circuit breaker panel 14 (shown in FIG. 1). In the exemplary embodiment, circuit breaker panel 14 includes a circuit breaker 200 that is configured to receive electrical power and selectively transmit the received electrical power to a line distribution, for example, a substation (not shown). Circuit breaker 200 is housed within a cubicle 202 of circuit breaker panel 14. A trip unit 204 is configured to receive electrical signals indicative of electrical parameters passing through line 38 from sensors 208. In the exemplary embodiment, sensors 208 include a potential transformer (PT) and a current transformer (CT). Trip unit 204 generates a trip signal using the electrical signals from sensors 208 to trip circuit breaker 200 when the electrical parameters exceed a threshold or other predetermined characteristic.

A transformer 210 housed in a cubicle 212 steps the voltage on line 38 down to a level suitable for use in supplying electrical power to auxiliary equipment associated with engine generator set 10. Transformer 210 is selectively tapped to provide a plurality of output voltages, such as 400 VAC and 480 VAC. Transformer 210 is coupled to a bus system to transmit electrical power to auxiliary loads coupled to respective circuit breakers in a cubicle 214. In the exemplary embodiment, a first circuit breaker 216 supplies a pump motor 218, a second circuit breaker 220 supplies a heater 221, a third circuit breaker 222 supplies an oil mist eliminator 224, and a fourth circuit breaker 226 supplies a fan motor 228. In various embodiments, other auxiliary equipment is supplied electrical power from cubicle 214.

In the exemplary embodiment, each of trip unit 206, transformer 210, and breakers 216, 220, 222, and 226 are communicatively coupled to output selector 60 through a network 230. During operation, output selector 60 is set to a predetermined frequency of operation for engine generator set 10. Accordingly, such setting is communicated to trip unit 206, transformer 210, and breakers 216, 220, 222 and 226. Additional equipment such as engine generator set control panel 40, ECM 42, automatic voltage regulator 44, overvoltage relay 46, undervoltage relay 48, overfrequency relay 50, and underfrequency relay 52 may also be communicatively coupled to network 230.

Figure 3:
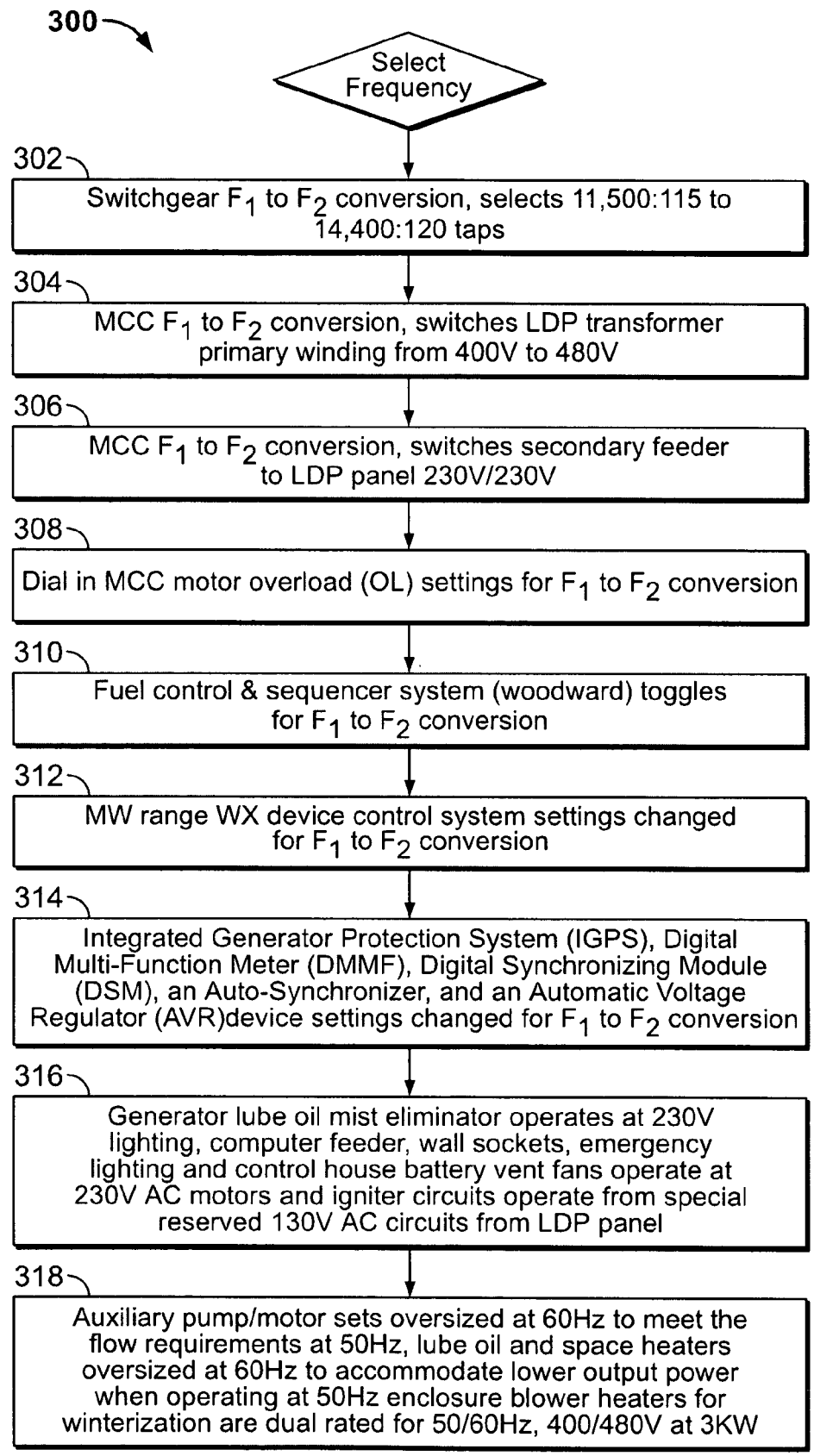
FIG. 3 is a flow diagram of an exemplary method of operating the engine generator set Shown in FIG. 1.

FIG. 3 is a flow diagram of an exemplary method 300 of operating engine generator set 10. Method 300 includes converting 302 switchgear associated with engine generator set 10 from an operational configuration for using the first voltage to the second voltage. Such conversion includes aligning taps on the secondary windings of potential transformers from a first tap to a second tap. A set on electrical contacts in a secondary circuit of the transformer are associated with output selector 60 such that the contacts align the secondary of the potential transformer to provide a first sensing voltage in a first position and a second sensing voltage when selected to a second position. In the exemplary embodiment, the potential transformer is tapped to provide an 115 VAC sensing voltage when electrical generator 16 output is 11,500 VAC and a 120 VAC sensing voltage when electrical generator 16 output is 11,400 VAC.

Output selector 60 also controls conversion 304 of a motor control center (MCC) that supplies power to the auxiliary equipment that supports the operation of engine generator set 10. For example, a lighting distribution panel primary winding is switched 306 from providing 400V to 480V and motor overload settings are modified 308 for 60 Hz operation from, for example, 50 Hz operation.

In the exemplary embodiment, other auxiliary equipment and control devices are configured to operate at the frequency and voltage selected by output selector 60. A fuel control & sequencer system is switched 310 to operate at the selected frequency and voltage. A MW range WX device control system settings are modified 312 and other protective device settings are also modified 314 to operate at the frequency and voltage selected by output selector 60. Such protective devices include an integrated generator protection system (IGPS), Digital Multi-Function Meter (DMMF), a Digital Synchronizing Module (DSM), and an automatic voltage regulator (AVR) device. At least some auxiliary equipment used to support the operation of system 10 includes a multi-power supply capability such that a selection of one configuration out of a plurality of available configurations permits operation of the auxiliary equipment at different selectable voltages and frequencies. Auxiliary equipment is also supplied from a constant output power supply coupled to system 10 output, for example, all lighting, computer feeder, wall sockets, emergency lighting and control house battery vent fans and generator lube oil mist eliminator operates 316 at 230V and all AC motors and igniter circuits operate from special reserved 130 VAC circuits from the lighting distribution panel. Additionally, other auxiliary equipment is oversized 318 to accommodate multiple power supplies such as heaters for ventilation, equipment conditioning, and fluid systems heaters are oversized at 60 Hz to accommodate lower output power when operating at 50 Hz, and auxiliary pump/motor sets are oversized at 60 Hz to meet the flow requirements at 50 Hz and enclosure blower heaters for winterization are dual rated for 50/60 Hz, 400/480V at 3 kW. Output selector 60 modifies the configuration of engine generator set 10 for operation at the first voltage and frequency, and modifies the configuration of the protection system and distribution system operating voltage, and support systems to the configuration for operation at the second voltage and frequency in less than about twenty milliseconds from operator initiation.

The above-described embodiments of an engine generator set facilitate providing power to a plurality of electrical systems with minimal reconfiguration of the engine generator and auxiliary equipment. Exemplary embodiments of engine generator set methods and apparatus are described above in detail. The engine generator set components illustrated are not limited to the specific embodiments described herein, but rather, components of each engine generator set may be utilized independently and separately from other components described herein. For example, the engine generator set components described above may also be used in combination with different engine generator set. A technical effect of the various embodiments of the systems and methods described herein facilitating generating electrical power for a variety of electrical systems where the likelihood of operator error in reconfiguring the set is substantially reduced.

While the invention has been described in terms of various specific embodiments, those skilled in the art will recognize that the invention can be practiced with modification within the spirit and scope of the claims.

What is claimed is:

1. An engine generator set comprising:

an electrical generator configured to provide electrical energy to a first load rated at a first voltage and a first frequency, and to provide electrical energy to a second load rated at a second voltage and a second frequency wherein at least one of the second voltage is different than the first voltage and the second frequency is different than the first frequency;

a prime mover rotatably coupled to said generator through a shaft, said prime mover configured to rotate said shaft at a first rotational speed when said electrical generator is generating electrical energy at the first frequency and to rotate at a second rotational speed when said electrical generator is generating electrical energy at the second frequency;

an engine generator set control system comprising:

a generator control system communicatively coupled to said electrical generator configured to control an output of the electrical generator;

an engine control system communicatively coupled to said prime mover configured to control a rotational speed of said shaft; and an output selector communicatively coupled to said generator control system and said engine control system, said output selector configured to modify the output of the engine generator set from the first voltage and the first frequency to at least one of the second voltage and the second frequency; and an electric motor supplied with electrical power from the output of said electrical generator through a motor protection circuit that includes at least one of an overload and a trip unit communicatively coupled to said output selector such that a trip setting of the at least one of an overload and a trip unit is modified by operation of the output selector.

2. An engine generator set in accordance with claim 1 further comprising a generator output potential transformer tapped to provide a first sensing voltage when said engine generator set is operating at the first voltage and to provide a second sensing voltage when said engine generator set is operating at the second voltage.

3. An engine generator set in accordance with claim 2 wherein said generator output potential transformer is communicatively coupled to said output selector.

4. An engine generator set in accordance with claim 1 further comprising an indicator indicative of a frequency selected by the output selector.

5. An engine generator set in accordance with claim 1 wherein said electric motor is sized to meet the load requirements of the motor when the engine generator set is operating at the first voltage and first frequency, and operating at the second voltage and second frequency.

6. An engine generator set in accordance with claim 1 wherein said generator control system further comprises at least one of an integrated generator protection system, a demand-side management system, an auto-synchronizer, and an automatic voltage regulator, said output selector configured to modify the at least one of an integrated generator protection system, a demand-side management system, an auto-synchronizer, and an automatic voltage regulator from operation at the first voltage and first frequency to operation at the second voltage and second frequency.

7. An engine generator set in accordance with claim 1 wherein said engine control system further comprises a fuel control and sequencer system, said output selector configured to modify the fuel control and sequencer system from operation at the first voltage and first frequency to operation at the second voltage and second frequency.

8. An engine generator set in accordance with claim 1 wherein said output selector is configured to alter an operating state of a relay to select an operating voltage and an operating frequency.

9. A method of operating an engine generator set comprising:
- selecting an operating voltage and frequency from a plurality of predetermined operating voltages of the engine generator set from a first voltage and a first frequency to a second voltage and a second frequency;
- selecting the selected operating voltage and frequency for an electrical distribution panel electrically coupled to an output of the engine generator set such that electrical loads and electrical protection equipment coupled to the electrical distribution panel are configured to operate using the selected voltage and frequency;
- selecting the selected operating voltage and frequency for a generator switchgear electrically coupled to an output of the engine generator set such that generator protection equipment coupled to the generator output are configured to operate using the selected voltage and frequency; and
- selecting a protective setting corresponding to the selected operating voltage and frequency for an electric motor supplied with electrical power from the output of said electrical generator through a motor protection circuit that includes at least one of an overload and a trip unit.

10. A method in accordance with claim 9 wherein selecting an operating voltage and frequency comprises selecting a tap for a generator output potential transformer tapped to provide a sensing voltage when said engine generator set is operating at the first voltage and to provide substantially the same sensing voltage when said engine generator set is operating at the second voltage.

11. A method in accordance with claim 9 further comprising indicating to a user the selected operating voltage and frequency.

12. A method in accordance with claim 9 wherein said generator control system further comprises at least one of an integrated generator protection system, a demand-side management system, an auto-synchronizer, and an automatic voltage regulator, said method further comprising modifying the at least one of an integrated generator protection system, a demand-side management system, an auto-synchronizer, and an automatic voltage regulator from a first configuration for operation at the first voltage and first frequency to a second configuration for operation at the second voltage and second frequency.

13. A method in accordance with claim 9 wherein said engine control system further comprises a fuel control and sequencer system, said method further comprising modifying the fuel control and sequencer system from a first configuration for operation at the first voltage and first frequency to a second configuration for operation at the second voltage and second frequency.

14. A method in accordance with claim 9 further comprising altering an operating state of a relay to select the operating voltage and an operating frequency.

* * * * *